A. Bain,
Automatic Telegraph.

No. 6,328.   Patented Apr. 17, 1849.

9 Sheets, Sheet 8.

Witnesses:
W. Serrell
Lemuel W. Serrell

Inventor:
Alexander Bain

A. Bain,
Automatic Telegraph.
No. 6,328.    Patented Apr. 17, 1849.

UNITED STATES PATENT OFFICE.

ALEXANDER BAIN, OF LONDON, ENGLAND.

IMPROVEMENT IN ELECTRIC TELEGRAPHS.

Specification forming part of Letters Patent No. 6,328, dated April 17, 1849.

*To all whom it may concern:*

Be it known that I, ALEXANDER BAIN, formerly of Edinburgh, now of the city of London, at present in the city of New York, electric telegraph engineer, a subject of the Queen of Great Britain, have invented and made and applied to use certain new and useful Improvements in the Construction of Electric Telegraphs, (for which original invention a patent was granted to me by the government of Great Britain and Ireland, dated in London the 12th of December, 1846,) for which said original invention, including other additional and important improvements thereon, I now seek Letters Patent of the United States, of which the following is a specification.

The said improvements differ with all other precedent modes employed in electric telegraphs, first, by using electricity in a manner independent of any magnetic action; secondly, in composing a message or communication by perforations through paper in sets of characters, each of which represents a letter of the alphabet, or numeral figure, or other needful sign, which arrangement of perforated signs, being arbitrary, may be changed at pleasure, so as to transmit secret or other important communications by signs not understood by those not having the key or index of the secret arrangement; thirdly, by an arrangement of mechanical means through which the non-conducting substance of the paper passing between the electrically-excited parts of the machinery interrupts the circuit, except when the perforated parts forming the signs pass between the electrically-excited parts of the machinery, and place these in contact in a manner that completes the circuit, transmitting a corresponding electric pulsation to the receiving apparatus at the distant station; fourthly, in recording the pulsations so given by the intermittently-passed electric fluid on chemically-prepared paper in such a manner as permanently to record on the chemically-prepared substance a succession of signs corresponding to the perforations in the papers used at the transmitting-station; and, fifthly, in the arrangement of mechanical means by which a communication, when composed, can be simultaneously transmitted through one machine to any plurality of distant stations at or nearly at the same instant of time, and as will be shown hereinafter, with a rapidity unknown in electro-telegraphic apparatus wherein magnetic influences are admitted.

The mode of effecting these operations is fully and substantially set forth in the following description, and shown in the accompanying drawings, making part of this specification of the said improvements, in which the several sheets show the successive parts of the machinery and operations, and these are described in the order in which the parts are used, the like letters, numbers, or other marks of reference employed herein, where the same mark is used more than once, applying alike to the same parts in all the figures and sheets referred to.

In these drawings, Figure 1, Sheet 1, is a front or full elevation of the machine for cutting paper into strips.

Figure 1:
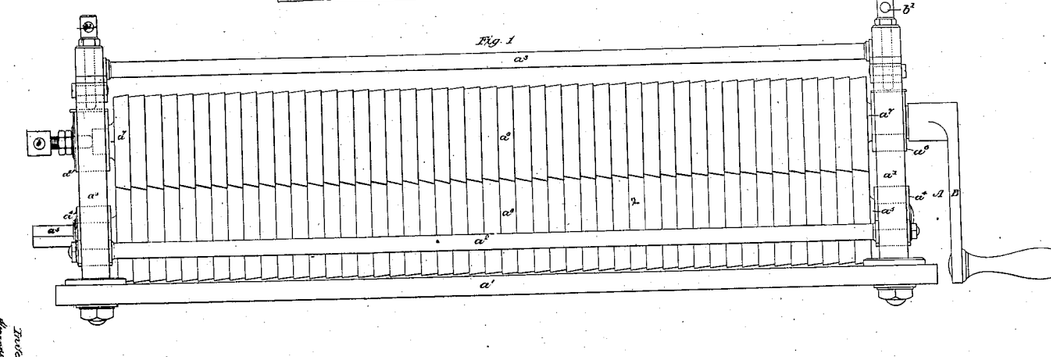
Figures 2, 3, 4, 5, 6:
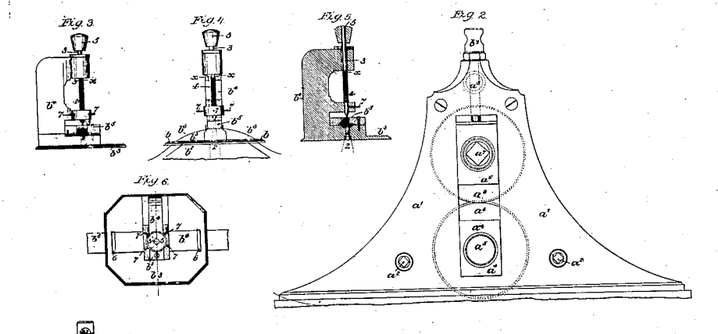
Fig. 2 is an end elevation of the same at the end A of Fig. 1, with the driving-handle B removed.

$a$ is a bed-plate of wood. $a'$ $a'$ are two metal standards. $a^2$ $a^2$ are two lower longitudinal tie-rods, with shoulders inside the standards, and screws and nuts outside. $a^3$ is a spreader-rod, merely shouldered, to enter a socket in the upper part of each standard, to gage their distance apart. $a^4$ are lower journal-boxes carrying the lower shaft, $a^5$. $a^6$ are upper journal-boxes carrying the upper shaft, $a^7$. The shaft $a^5$ carries the lower roller, $a^8$. The shaft $a^7$ carries the upper roller, $a^9$. These rollers are formed with handed serrated grooves, as shown in the drawings, the pitches from the back of each groove to the edge of the next being exactly alike, to cut paper, when passed through in equally wide parallel slips, for use in the transmitting part of the machinery, by the edges of the serrated grooves dividing the paper, with the operation of rotary parallel cutters. The end adjusting-screw, $b$, next the end of the shaft $a^7$, gives the means of keeping the cutting-edges in contact, and the vertical adjusting-screws $b'$ adjust the pressure of the top roller on the one below. The handle B may be used indifferently on the upper shaft, as shown, or on the other end of the lower shaft, as may be convenient. The uses of this machine will be fully obvious without further explanation, and it is described as the best-known application of mechanical means for this purpose.

Figure 7:
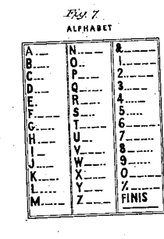

Before describing the means of making the perforations to form the signs it may be proper to describe the signs hitherto found most available by referring to Fig. 7, Sheet 1, by which it will be seen that the letter A is formed by one small dot and a line, thus: - —; the letter B by a dot, a line, and a dot, thus: - — -, and so on of the rest; but it will be seen that all the letters to N, inclusive, except I, are begun with a dot or dots to the left of the line, L being formed by four dots and O by two dots. All following are begun with a line to the left of the dot or dots used, the Y and Z, with the abreviation &, being represented by lines only. The numeral signs to 5, inclusive, also commence with a dot or dots, and from 6 to 0, inclusive, these numerals begin with lines. The fractional line is represented by — · — · —, and is to be preceded by the numerator and followed by the denominator of the given fraction, thus: - - - - - — - — — - - - will represent five-eighths, and so on of all the other signs. It has been before noticed that these signs are arbitrary and changeable; but, as will be seen hereinafter, the means of composing, transmitting, and recording signs are equally effective for any other system of signs that may hereafter be found either better in arrangement or more especially applicable for any particular object.

The mechanical means of composing any communication by the above or any agreed system of signs by perforations through paper are also shown in Sheet 1, wherein Fig. 3 is a general side elevation, Fig. 4 a front elevation, Fig. 5 a sectional elevation through the central line of Fig. 6, which is a plan of what will be understood as a small punch-press, shown as full size for use, and the acting parts fitted with reference to this particular purpose. In these $b^2$ is the bearing-block, which may be made and placed in any convenient manner, and carries the bed-plate $b^3$ of the standard $b^4$, on the foot of which is the guide-block $b^5$, formed with a wide shallow groove beneath, and with an under cut bevel on the left side, shown full on Fig. 3, and by dotted lines in Figs. 4 and 6, allowing the operator to see the perforations as they are made through the passing paper. A steady pin and screw hold the block on the bed, and the die 1 lies under the block $b^5$ and has a conical hole opening downward to the top of a hole, 2, in the bed-plate $b^3$ and block $b^2$. The punch 3 passes through the head of the standard $b^4$, with a pin, into a groove to keep the punch from turning, and has an expansive helical spring, 4, round it, footing on the guide-arm of the standard, and at top taking a pin, $x$, in the punch. The shoulder of the driving-head 5 comes down on a leather washer beneath. The slots 6 in the plate $b^3$, or staples on the plate, serve as entering and leaving guides to the paper $b^6$; and the set-screws 7 in the guide-arm of the standard serve to center the shaft of the punch as it wears in use. The punch is cylindrical, having a flat end and a sharp edge, and the whole of the parts very accurately fitted and adjusted together without any lateral shake in the punch, so that it enters the die properly. When so completed the compositor passes a strip of paper, of any required length, from beneath, through the right-hand slot 6, and under the guide-block $b^5$, out and downward through the left-hand slot 6, when the compositor strikes the head 5 with a small ball of wood, covered with leather or india-rubber, in his right hand, which forces the punch-point through the paper into the die, cutting out a small disk that falls through the die and holes below. The expansive spring 4 throws the punch up, while the compositor, by his left finger and thumb, draws the paper on to strike successively again on the punch-head at the required distance, which, for a second or next successive single perforation, should be equal to the diameter of one dot, the space between a dot and the commencement of a line the same. To form a line the compositor draws the paper on a little less than the diameter of a dot, successively, until he has struck the punch so many times as will form a line equal to three diameters of one dot, leaving a space between the ends and the commencements of lines, in the same manner, equal to the diameter of one dot, the space between each two letters equal to four dots, and the space between each two successive words equal to the diameters of eight dots. This process forms groups of perforations in a continuous line, each of which groups complete a sign representing a letter or numeral, and the larger spaces show the ends and commencements of words that, so placed, are formed and read from left to right, along the center of the paper, in the same manner as common writing or printing. In this manner a competent compositor, with a thorough knowledge of the signs, will compose a communication nearly as fast as it can be set up in type, and as fast as the same quantity of matter can be marked upon paper, by magnetism operating through mechanical means. When all the perforations are made the paper strip is to be wound on a roller which fits into the transmitting-machine, so that the communication is ready to be passed through that machine, which is next to be described, as follows:

In the Sheet 2.

In Sheet 3, Fig. 12 is an elevation of the side L, Fig. 8. These last four figures are all shown in one-fourth size. In all these five figures C is the bed-frame, and D D are the legs to sustain E, the box containing and sustaining the machinery. F is a hand-wheel outside of G, which letter G refers to the space and frames of the clock-work, in which $c$ is the principal shaft from F to the first wheel, $c'$, gearing to 8, the first pinion and shaft. This pinion gears into a second wheel, $c^2$, which gears into a second pinion, 9, which is on a shaft that carries a miter-wheel, $c^3$, which gears with a horizontal miter-wheel, $c^4$, on the governor-shaft 10. The governor is fitted to lift the slider from below, but otherwise in the usual way, and needs no further description, except that it is regulated as to speed by the contact of the upper sides of the upper arms with the lower edge of the tube 11, formed as a female screw to receive the male screw on the lower end of the tube 12, which is attached to the bar above, so that by turning the tube 11 to unscrew from the tube 12 the friction on the arms of the governor is increased, and, as a consequence, the speed of the machine decreased. The contrary effect is produced by turning the tube 11 to screw upward. In the space denoted by the letter G the frames, and most of the clock-works, and some other parts, referred to by successive marks, are shown by dotted lines as being within the box E. The internal standards and other supports are not shown, to avoid a complexity of lines; but these parts are all duly provided, and the pillars and frames that support the governor are as shown in the drawings.

The action of the governor is communicated as follows: Two frames, 13, carry 14, the fulcrum of a lever and weight, 15, lying inside the fulcrum, the other portion prolonged outward—as a fork, 16, the arms of which pass, one on each side the governor-slider, between collets that lift the arms 16, and a piece of brass, 17, on their outer ends, out of contact with the parts below them when the machine is in work; and when not in work the contact of these parts serves a purpose that will be hereinafter described.

The proper motions are given to the transmitting apparatus from the wheel F, as follows: On the inner end of the shaft carrying the second pinion, 9, a pipe, 18, is riveted, that carries a cross-bar, $c^5$. This bar takes on its opposite sides the ends of pins 19, that protrude from a catch-bar, $c^6$, which is on this end of the principal internal shaft, $c^7$, lying across the machine, in two frames, $c^8$, that respectively form bearings for the ends of the shaft $c^7$, which, at the opposite end, carries a cross-bar, 20. This bar must be made of ivory, or any other non-conducting substance strong enough for the purpose, and that will be effective in isolating the electric current in the transmitting parts of the machine, so that it does not go through the bar $c^7$ to the other side of the machine. The ivory bar 20 takes on its opposite sides the points of pins 21, that protrude from the catch-bar $c^9$. This is on the inner end of the shaft 22, that carries the leading roller $d$, so that the bars and pins collectively form open clutch-frames, that allow of detaching the leading roller $d$ from the shaft $c^7$ without disturbing the other parts of the work.

The outer end of the shaft 22 lies in the lower forked and open bearings of two standards, 23, placed on the bearing-plate $d^3$. The same piece forms upward-like open bearings for the shaft 24, that carries the pressing-roller $d'$.

At × a small standard supports an arm, 25, that forms the fulcrum of the pressing-lever and weight $d^2$. The weight, sliding on the lever, is adjusted to give a proper pressure, and secured there by the screw 26. The lever $d^2$ terminates in a fork, 27, the parts of which lie one on each side the pressing-roller $d'$ on the shaft 24, to keep the roller $d'$ down to draw the paper through, as is hereinafter shown; but when the transmitting part is not in use the lever $d^2$ and weight may be turned back over the fulcrum and hang down by the front of the box E.

Figure 9:
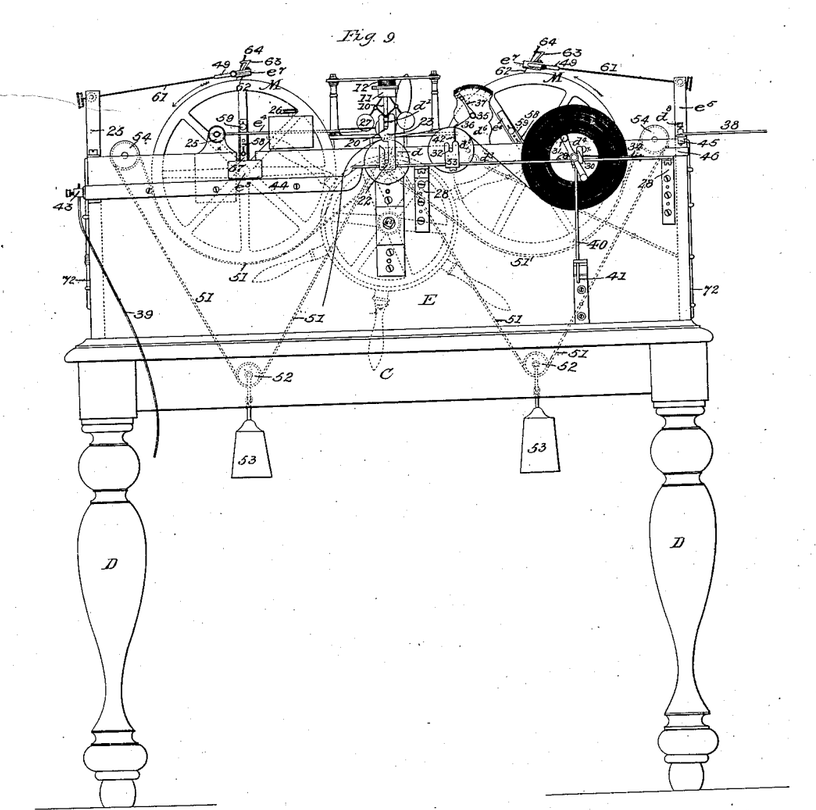
Fig. 9 is a front elevation on the side H of Fig. 8.

The bearing-plate $d^3$ will be best made of metal, and supported at the front of the box E by metal brackets 28, as seen best in Fig. 9, to keep the transmitting parts duly in place and adjustment to each other.

The open bearings 30, on $d^3$, carry the shaft 29 of the paper-roller $d^4$. A pair of pins, ×, go through the horns of the bearings 30, and a pair of rising-springs, 34, press against the under side of the shaft 29, to create a friction between their points and the axle, and between the axle and the pins × sufficient to prevent the paper on the roller unwinding too quick when in use. The handle 31 serves to wind the paper onto the roller.

At $d^6$ is a standard forming an index-plate, carrying a stud having on it a socket-pipe, 35, with a binding-screw that secures a brush or comb of metal, 36, the points of which overlie the paper having the perforations, and these points complete the electric circuit by contact through the perforations in the paper, with the transmitting-roller $d^5$ lying under the comb or brush 36 on a shaft, 32, in open bearings 33.

A pointer, 37, on the socket-pipe 35, gives the means of regulating the pressure of the points of the comb 36 on the roller $d$ 5, and keeping that pressure equal by a screw, ×, going through the pointer 37 into shallow holes in the index-plate $d^6$.

The guides 40, on each side the paper-roller $d^4$, hang on joints under the plate $d^3$, and their lower ends take a bracket, 41, having notches, by which the guides 40 are kept to the paper when winding on, and from the paper when winding off. The guides 42 keep the paper fair on the transmitting-roller $d^5$.

The brass wire $d^7$ is attached by a binding-screw to the standard $d^6$, and carried on by staples inside the box E, so that the other end is attached at $d^8$, by a binding-screw to the wire 38, that leads to the distant station.

At 39 is the wire connecting to the positive pole of the voltaic battery, with a binding-screw, 43. These are in contact with a plate, 44, on the front of the machine, completing the circuit to $d^3$, the bearing-plate before referred to.

At 45 is a spring, with an inverted stud under the free end, to form contact with the conducting-block 46, when required.

47 is a continuation of the spring 45, extending to the binding-screw $d^3$, and thence at 48 to the foot of the standard $e^5$, hereinafter referred to.

The action of the transmitting apparatus is as follows: A person is to turn the wheel F at the rate of one revolution of the wheel per minute of time in the direction of the arrow on it. The speed so given is ascertained by dials and pointers, that are hereinafter fully explained, and by the clock-work. These give the proper motion to the shaft $c^7$ and leading roller $d$. The electric current from the positive pole of the battery, entering by the wire 39 to the binding-screw 43, and thence by the conducting-plate 44, then travels on to the plate $d^2$; thence through the transmitting-roller $d^5$ and perforations in the paper containing the message, to the brush 36; from thence, by the pipe and stud 35, to the wire $d^7$, thence to the distant station by the long telegraph-wire 38. The paper being a non-conductor of electricity, the electric current flows on through the wire 38 in a series of intermittent long and short pulsations, regulated by the perforations in the paper as they successively pass under and allow the points of the wire brush 36 to come in contact with the roller $d^5$, thus transmitting these electric pulsations to the receiving-station with much greater rapidity than by any other known mode.

It is proper here to remark that the same wire 38 which transmits a communication from one station to another also receives in the opposite direction any communication from the second or other station to the first station, as hereinafter shown.

For the purpose of giving a preparatory signal to the receiving-station that a message is to be sent on, the spring 45 serves, when pressed down in contact with the block 46, to transmit a current into the wire 38 by the plate 47. This circuit is completed by simply pressing the spring 45 onto the block 46, and may be occasionally used to transmit short notices.

Having thus shown the construction, operation, and effect of the transmitting portion of the apparatus, the receiving and recording portion comes next in order. All these portions are embodied in Figs. 8, 9, 10, 11, and 12, Sheets 2, 3, and 4; but it is first to be considered that a similar machine is to be placed at each of two distant stations, so that the wire 38 is employed as the connection to and from each. Then the following description will be fully understood.

It may be proper to notice that the figures show two large receiving metal cylinders, M, and to explain that the general description following will only refer to the operations effected with one cylinder, as the second is to be considered as an auxiliary, to be ready for use when the first is either removed to transcribe a previous communication or to complete any communication so long that it cannot be contained on the first cylinder. These cylinders and their shafts fit either position in the machine, and one can be equipped for use while the other is in action.

The principal shaft $c^7$ is fitted in nearly the center of its length with a double pulley, $e'$, to give motion to an endless cord or band, 51. The first bight of this lies round the pulley. A second bight descends to pass through a pulley, 52, that supports a weight, 53. The next bight passes over a pulley, 54, and the fourth bight passes under the receiving-cylinder M to the pulley $e'$.

The cylinder M is mounted on a shaft that does not revolve with the cylinder. The part $e^2$ of the shaft is blank, but the part $e^3$ is made as a screw with a left-handed thread cut into it. This part is lodged in the opening 55 in the side of the box E. The end of the part $e^3$ is lodged in a metal bearing, 56, on the opposite side of the box, with a pin going through the shaft that slips into a hole in the bearing, so that the shaft cannot turn; but that and the cylinder may be conveniently lifted out and replaced when needful. The screwed end of the right-hand shaft, Fig. 8, appears to overlie the wire $d^7$; but the wire is so much below the shaft that they do not touch.

On the end of each cylinder that is next the screw are slotted steel slips $e^4$, forming tongues, the points of which enter and travel round the screw. A guide and steady screw, 57, goes through a slot in the slip. A hand-pin, 58, gives the means of sliding the slip, and a guide and set-screw, 59, secures the slip when adjusted.

Figure 8:
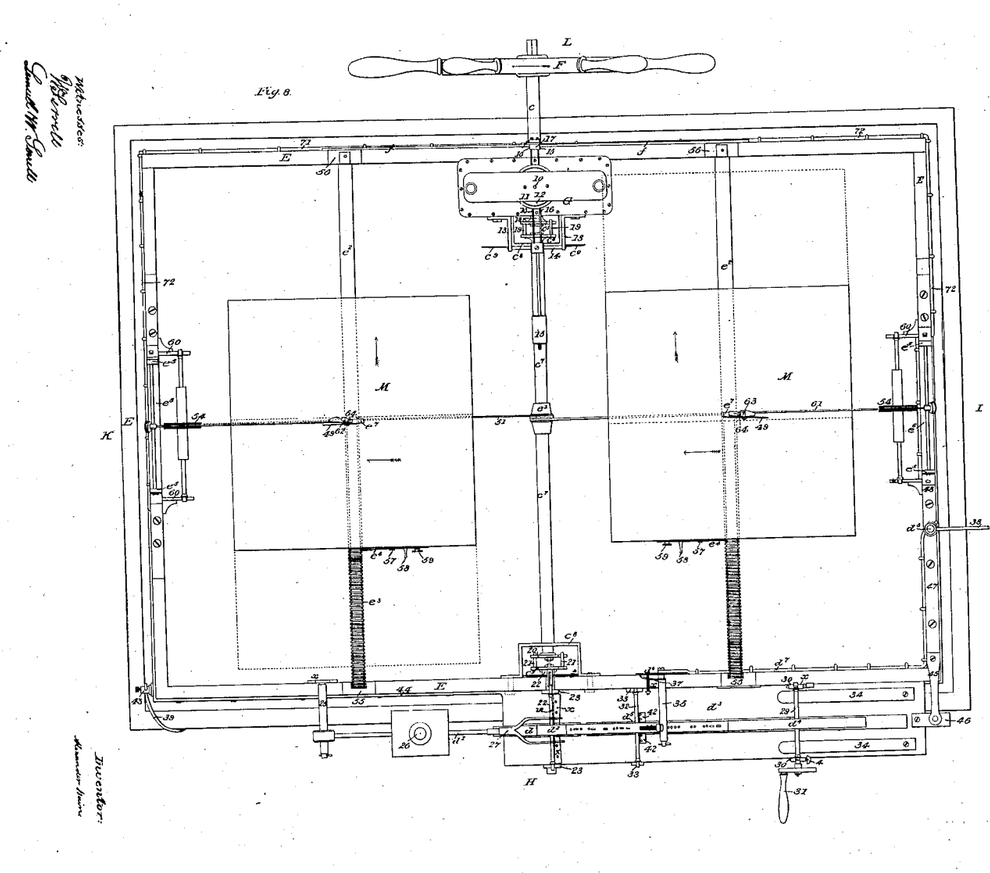
Fig. 8 is a half-size plan of the transmitting and receiving apparatus. One such complete apparatus is to be placed at each station.

In Fig. 8 dotted lines show the relative position that the right-hand or other cylinder will take when it has been fully used. The dotted lines to the left-hand cylinder show the relative position of either of the cylinders when first ready for work. The operation of these parts is that while the apparatus is in work the band 51 beneath causes the cylinders to rotate in the direction of the black arrows on them, and the steel tongues in the screw-thread give them a gradual motion across the machine in the direction of the red arrows, which motion is equal to the pitch of one screw-thread for each entire revolution of the cylinder, so that marks made by a fixed point in contact with any substance on the cylinder are made and can be read from left to right in successive lines, the same as common printing or writing.

The standards $e^5$ are fitted below with arms forming bearings 60 for the arbors of the pulleys 54. At their tops the standards carry the axles $e^6$ of the stems 61. These have on their points the holders $e^7$, which are fitted to receive the writing or marking styles 62. These styles are best made of hardened and tempered steel.

Above and upon each holder $c^7$ a bracket-piece, 63, receives a set-screw, 64, to regulate the styles 62, and on one side of each holder $c^7$ a knife, 49, is set on a screw-pivot, so that by throwing it forward a portion of the paper may be cut from the cylinder, and when thrown back it is out of operation.

Figure 10:
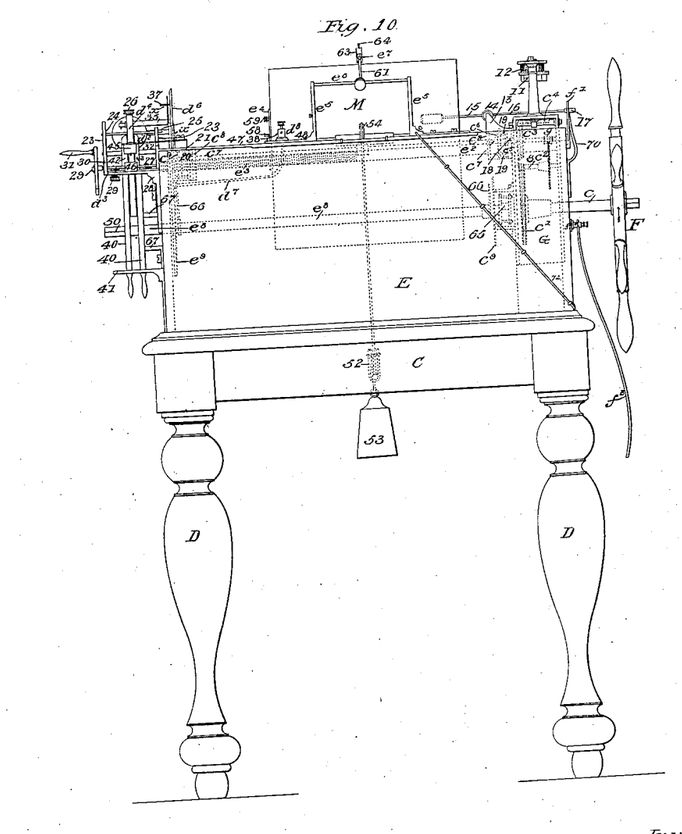
Fig. 10 is an end elevation of the end I, Fig. 8. In the Sheet 4.
Figure 11:
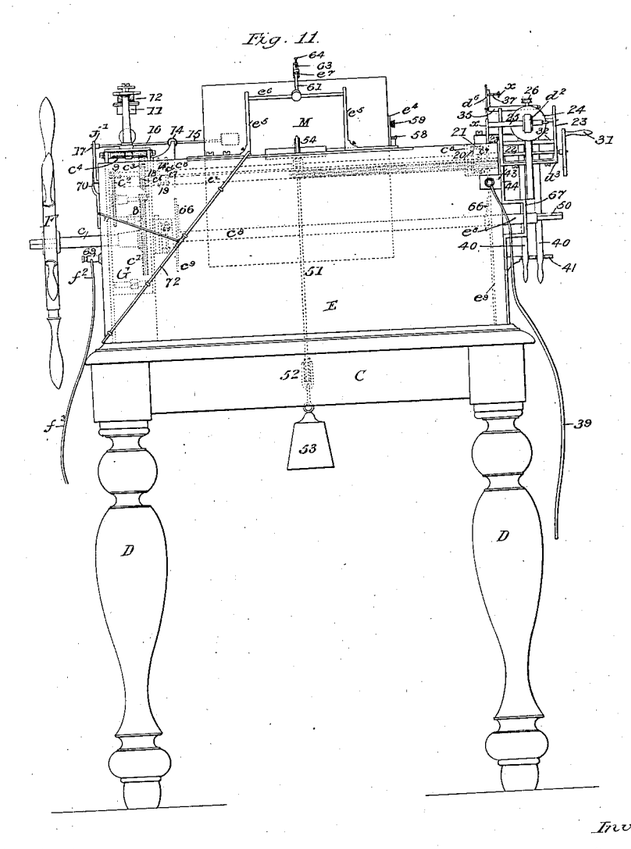
Fig. 11 is an end elevation at the side K of Fig. 8.

In the Fig. 10, Sheet 3, and Fig. 11, Sheet 4, parts are shown by dotted lines that from the inclosure of the box and the overlying of the upper parts cannot well be shown in any other manner. In these $e^8$ is a cross-shaft set in the same line with the shaft $c$ of the wheel F, and connected to that shaft by bars and pins, forming an open clutch-frame, 65, similar to those on the shaft $c^7$. This shaft $c^8$ has a frame bearing at the end next the wheel $c'$, and at the opposite end terminates in bearings 67 outside the box, and is fitted with a square, 50, on which the operator may place a handle to work the machine in the absence of a person to work the wheel F.

Within the box the shaft $e^8$ carries a pointer, 66, one in front of each of the two dials $e^9$. These are so placed that the person at the wheel F sees the dial next the operator, and the operator sees the dial next the wheel F, so that either or both persons have occular means of knowing that the machinery shall only be driven at the rate of one revolution of the wheels F and $c^1$ in each succeeding minute of time by a watch placed in view of the person at the wheel and of the operator, as this uniformity of speed is essential to the correct operation and effects of the acting parts at both the transmitting and receiving stations.

Figure 12:
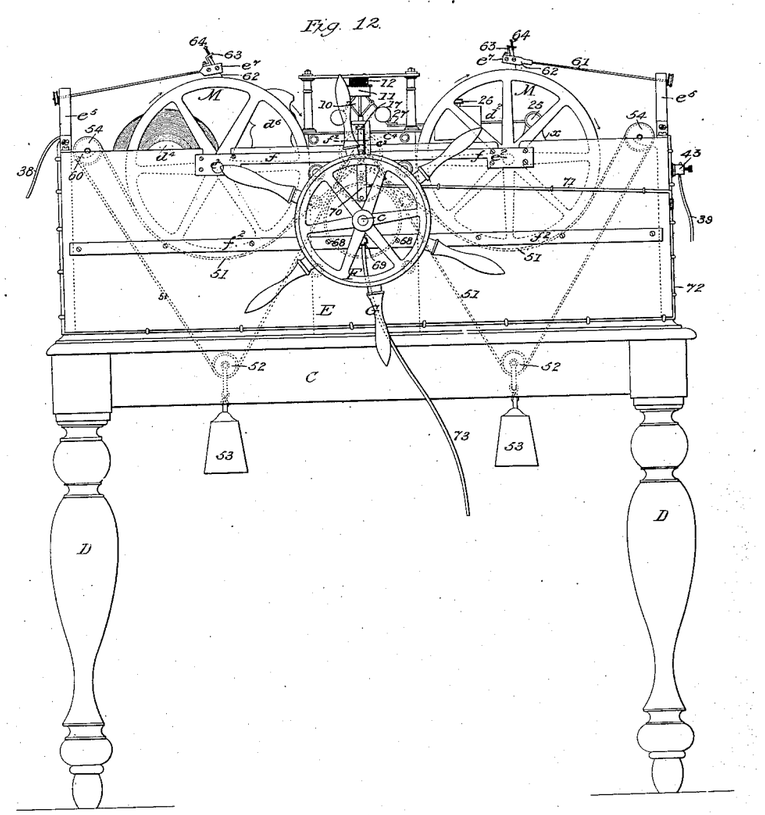

In Fig. 8, Sheet 2, and Fig. 12, Sheet 4, $f$ is a conducting-plate, the ends of which are in contact with the blank ends $e^2$ of the cylinder-shafts. This plate $f$ has near the center of its length a knee-piece, $f'$, the horizontal arm of which lies above the points of the two arms 16 and plate 17 of the lever 15. When the apparatus is not in work the piece 17 lies on the top of a piece, 70. (Seen best in Fig. 12.) The piece 70 is connected by a wire, 71, to the wire 72, which passes round the box to the standards $e^5$ at each end. The screws 68, Fig. 12, go through the box into the clock-work, and hold a second conducting-plate, $f^2$. This is by a binding-screw, 69, connected to a wire, $f^3$, that leads to a copper plate in the earth.

The general action, uses, and effects of these parts are as follows: To receive a communication the wire brush 36 is to be turned back to the right by means of the pointer 37, to be out of contact with the transmitting-roller $d^5$. Then take a piece of fine, good, smooth paper, the width of which should be equal to the lengths of the cylinder, and long enough to go round the cylinder M, with the ends lapping over each other about a quarter of an inch. This paper is to be previously prepared as follows: It is to be laid on any clean surface that acids will not act on. The paper is then to be covered on the upper surface with oil by a very clean sponge. For this good salad-oil will answer; but other oils will answer if they do not evaporate too quickly, because the use of the oil is to lessen the evaporation of the chemicals next noticed by retaining their moisture. The paper is then to be turned over and washed with a clean sponge containing a solution of nitric acid, prussiate of potash, and liquid ammonia in the following proportions. The ammonia is merely added to prevent the other ingredients from rotting the paper: two parts, by measure, of pure nitric acid, twenty parts, by measure, of a saturated solution of prussiate of potash in distilled water, and two parts of pure liquid ammonia, mixed together. The paper so prepared is to be laid, with the oiled surface upward, on and round the cylinder, and the lapping edges fastened with a little gum-water. The cylinder is then to be put in place, and the steel style 62 is to be turned on to the paper, as shown in Figs. 9 and 12. The apparatus is then ready to receive a transmitted communication. The machinery is then to be worked by a man at the wheel F at the rate of one revolution of the wheel per minute, the same as in transmitting a communication, and as before stated.

The operator at any one distant station transmits the electric current in pulsations regulated by the perforations in the paper he is using, as already explained, and these pulsations are received by the wire 38, as before mentioned. They pass by the screw $d^8$ and standards $e^5$, axle $e^6$, thence to the stem 61, and through that to the style 62, and through the chemically-prepared paper to the cylinder M, leaving a series of dark marks on the paper, which, though less in size, will be in number and position an exact transcript of the perforations in the paper used at the transmitting-station. It is proper to notice that steel styles leave a dark mark approaching black or blue-black on the paper; but copper styles will leave a brown mark on the paper. It is not intended to discuss the theory of the causes that produce these effects and facts; nor is it intended to claim the use of any particular chemical solutions, either separate or conjoined, because the paper saturated with a solution of nitric acid only will receive a communication that will not become visible until the paper is washed with a solution of prussiate of potash. Therefore, any chemical solutions may be used that will produce the best effects, and I have stated the solutions of nitric acid and prussiate of potash as those that I have hitherto found most effective in practical use. After the current has produced its mark and passed into the cylinder M it passes into the axle $e^2$, thence to the conducting-plate $f$ at the back of the machine, Fig. 12. This has a kneed piece, $f'$, the horizontal arm of which is above the piece of brass 17 on two arms, 16, of the lever 15, and by contact with that while the machine is working the electric current passes into the clock-work, thence by the screws 68 to the plate $f^2$, Fig. 12, thence by the binding-screw 69 and wire $f^3$ to a copper plate, which is to be buried in the earth at the nearest convenient point to the instrument. The current then passes, by the moisture of the earth, to the negative pole of the source of the electric power. When the machine is not in action any currents that may be sent through this circuit will pass from the wire 38, by the standards $e^5$ on the right-hand end of the machine, to the wire 72, thence to the wire 71, from that to the piece of brass 70, thence by the brass 17 to the arm 16, and thence to the clock-work, thence by the wire $f^3$ to the earth. By these arrangements if there are a plurality of machines in any one circuit, the machines not in use cause no interruption to the electric circuit. These several electric connections are the best that have hitherto been used, but may be varied in several ways other than those described and shown; but it is to be particularly borne in mind that in any case the electric current must pass from the marking-style to the chemically-prepared paper, and not from the paper to the marking-style.

Having detailed the construction, operation, and effects of these improvements as applied from one telegraph-station to another, the means are now to be described by which one communication is to be transmitted from a transmitting-station to any plurality of receiving-stations at, or very nearly at, the same instant of time.

In the Sheet 5 the Fig. 13 is a plan of a transmitting-machine, shown as of one-half size, for transmitting a communication simultaneously to each of six distant stations. In Sheet 6, Fig. 17 is an end elevation at the end Q of Fig. 13.

Figure 13:
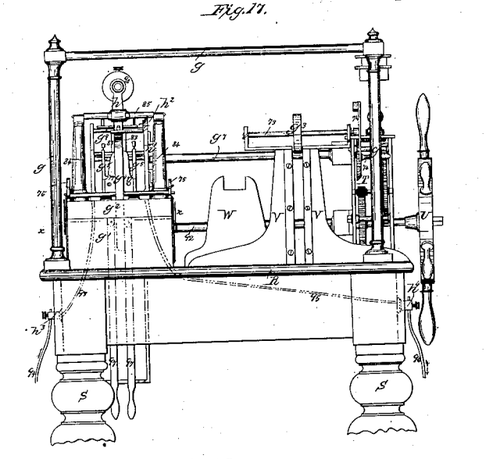

In these figures R is the bed or table frame, and S the legs that support the machinery. $g$ $g$ are pillars and rods surrounding the work and sustaining a cover when the machine is not in use. $g'$ are standards, and $g^2$ a platform-board. It is needful that all these parts should be of hard, dry wood, that will be a non-conductor of electricity and also be effective to carry the working parts of the machinery.

Figure 15:
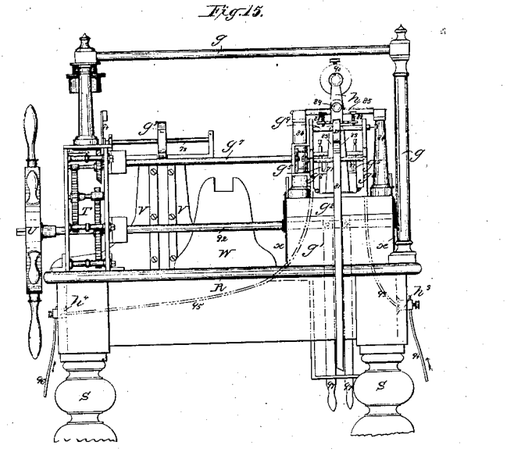
Fig. 15 is an end elevation, as seen at the end O of Fig. 13.

At T is the inclosure of the clock-works, with all the interior parts and the governor, the same as those previously described and shown, as used in the former apparatus, except that the governor has neither slide nor cross-lever; and the Figs. 15 and 17 show those frame-plates and binding-pillars, with the wheels and shafts or arbors of the clock-work in full lines, that could only be denoted by dotted lines in the drawings, that include the same parts in the former machines. In these figures the driving-wheel is marked U instead of F.

V V are a pair of standards fixed on the bed-piece, forming guides for the paper and carrying the shaft 73 of the paper-roller $g^3$, with a handle and balance-weight, 74. These receive the paper that contains the communication, which, when wound on for use, is transferred to 75, where the paper and roller $g^4$ is shown in place for working off the communication, suspended in the open bearings of standards 75, with pins above and friction-springs below the shaft, and guide-levers 97 for the paper, the same as shown in the former machine. These guide-levers 97 are shown here as for use, if a communication should have to be repeated, to guide the paper onto the roller again. A slot, 76, in the platform $g^2$ in line with the roller, gives space for a quantity of paper on the roller.

Figure 14:
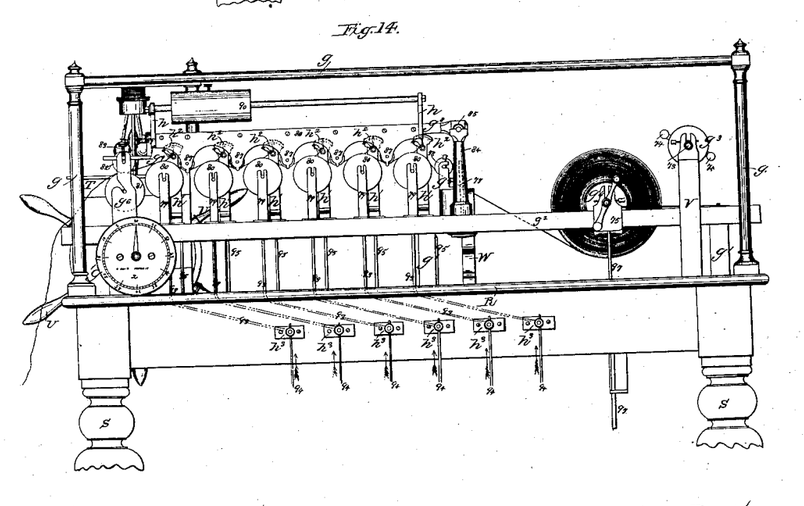
Fig. 14 is a front elevation of the same machine, seen on the side N of Fig. 13.
Figure 16:
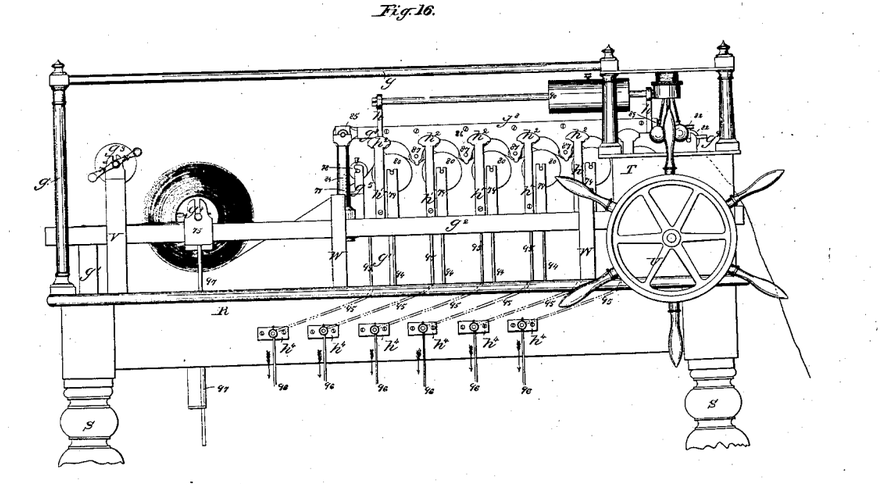
Fig. 16 is a back elevation, as seen on the side P of Fig. 13.

On the foot of a small two-part standard, $g^5$, is a guide-fork, 77. (Seen in dotted lines in Figs. 14 and 16, and full in Fig. 17.) This fork 77 leads the paper to the guide-roller 78, the arbor of which is in open bearings on the standards $g^5$, with pins to keep the arbor in place. The six double standards 79, each pair on one foot, are screwed to the platform $g^2$, and are fitted each with an open bearing carrying the arbors of the successive transmitting-rollers, 80. These are shown as six, but may be more or less in number.

At $g^6$ a double standard is fitted with two open bearings on each upright. The lower bearings carry the arbor of the leading roller, 81. The upper bearings carry the arbor of the pressing-roller 82, and a guide-fork, 83, on the foot of the standard $g^6$ has one arm on each side of the rollers 81 and 82, and a cross-shaft, $g^7$, from the clock-works T connects the driving-power with the leading-roller 81 by open clutch-frames having the same parts and action as have been already shown and described in the former machines.

The pillars 84 on $g^2$ are fitted at their tops as bearings to sustain the journals of a cross-head, 85, that takes this end of a carrier-bar, $g^8$, which has on each side a plate, 86, that is cut into a series of five pendent bearings, 87, one descending between each two of the transmitting-rollers 80, and each pair of bearings carrying between them a small guide-roller. (Shown in place, but not marked.) Each pendant is lengthened below the roller, to form guides on each side of the paper as it passes over the transmitting-rollers and beneath the guide-rollers.

A fork, $g^9$, with leveling-screws, 88, overlies the arbor on each side of the pressing-roller 82, and a screw and nut, 89, on this end of the bar $g^8$, secures the flange of the fork $g^9$ and holds one of two standards, $h$ $h$, on the bar $g^8$. These standards carry the bar and adjustable weight 90. The whole of the parts attached to the bar $g^8$ are fitted to serve the purpose of guiding the perforated paper truly in a compound-curved line over the transmitting-rollers and beneath the pendent rollers, so that the paper passes with a tension that causes a slight pressure on each transmitting-roller; and the weight 90, through the fork $g^9$, keeps the pressing-roller 82 down on the leading-roller 81 with a pressure regulated by the position or ponderosity of the weight to draw the paper through the machine at a proper and regular speed. To aid this operation the circumferences of the rollers 81 and 82 may be slightly roughened.

When it is intended to enter one end of a paper for passing it through the machine, the bar $g^8$, with its appendages, are to be lifted out of place and laid onto the wooden bearing-standards W. These are placed on the bed of the machine for this purpose, and when the paper is entered and placed the bar and its appendages are to be returned to their proper position.

The standards $h'$ are screwed on the platform $g^2$, and each terminates upward, as an index-plate, $h^2$. On this each has a stud and pipe carrying a comb or brush that overlies the corresponding transmitting-roller and an index-pointer and pressure-screw to regulate the contact of the brush and roller, all made and operating precisely in the same manner as the comb or brush that completes the electric circuit in the former or transmitting machine before described.

It may be proper to notice that the standards of the transmitting-rollers and those of the combs or brushes are insulated as regards each other—that is, they do not any one touch another, and both are insulated, as regards any other electric action, by the platform $g^2$, which, for this purpose, must be made of very dry and hard wood, and it will be found best in practice to have hard, dry wood as the material for the whole of the table frames and legs used for supporting this machinery.

At $x$ are two dials with pointers on the cross-shaft 92. These are all fitted and placed as already described to assist in regulating the speed at which the machinery must be worked.

Each standard 79 is connected to a binding-screw, $h^3$, by a wire, 93, and thence by a wire, 94, each to the positive pole, or that by which the electricity leaves each separate battery, or other fit source of electricity which travels in the direction of the arrows.

It must also be noted that the negative pole of each battery must be put in electric communication with the earth. The wires 95 each lead from a separate comb-standard, $h'$, by a binding-screw, $h^4$, and leading-wire 96, to a separate distant station.

It is believed to be sufficiently plain, without much explanation, that as the perforations composed in the paper successively pass under each comb the electric circuit will be completed by the points of the comb coming in contact with the roller through each perforation, and that a corresponding series of rapid electric pulsations will be thus communicated simultaneously to the marking-style at each distant station.

It is proper to remark that the battery in connection with each transmitting-roller must be of proportionate strength to the distance the current has to travel; and these arrangements admit of so graduating the strength of each battery, because each separate circuit is totally and entirely independent of any other circuit; and each circuit is completed at the receiving-station independent of any other station, and the communication transmitted is received and recorded at each receiving-station in the same manner and with the same effects as if made by the single-acting machine first described.

All other electric telegraphs hitherto used are dependent on the motive power of electro-magnetism for their action, and many mechanical means have been sought or tried whereby to adapt this power for use, the main principle remaining the same in all. The machines are consequently all designated "electro-magnetic telegraphs;" but electricity travels with a velocity capable of giving several thousand signals per minute of time, and any apparatus composed more or less of ponderous bodies, having also to give motion to other and similar bodies, cannot act with more than a fraction of the velocity with which electricity travels; and another and greater hindrance is that however skillful an operator may be he can only open and close the electric circuit in a manner which again reduces the numerical velocity of its pulsations, and no other mode has yet effected the correct transmission of the same communication to a plurality of distant receiving-stations. I have, therefore, in my hereinbefore-described invention rejected magnetism altogether, and caused the pulsations of the electric current to be transmitted through groups of perforations forming signs, which are recorded at the receiving-station by the pulsations of the electric current acting on chemically-prepared paper in the manner described and shown, so that the circuit is completed and interrupted by the operation of the composed communication itself, without the electric current having to produce any mechanical motion, and without any manipulation of the operator in forming the intermittent pulsations of the electric current, thereby effecting the transmission of a communication to one or a plurality of distant receiving-stations with far greater rapidity than by any other known mode.

It is not deemed requisite to describe or refer to the voltaic or any other source of electricity; nor is it intended to claim the application of that or any other electric source to these purposes; nor is it intended to claim any of the parts employed herein irrespective of the uses to which they are severally put, as herein described; but, I do claim as new and of my own invention and desire to secure by Letters Patent of the United States—

1. The composing of electro-telegraphic communications by making groups of perforations through paper corresponding with, or representing the signs to be transmitted, irrespective of the general arrangement of the collective or individual signs, and irrespective of the mechanical means employed to make the perforations.

2. The application of paper so perforated to open and close an electric circuit, or several successive circuits, thereby transmitting the electric current or currents in successive pulsations that correspond with the perforations in the paper, substantially in the manner described and shown, but including any merely practical or convenient variations of the mechanical means or materials or fabrics employed that are analogous or equivalent in their operations and effects.

3. The application of any suitable chemically-prepared paper, without regard to the chemical ingredients used for such a purpose, to receive and record signs forming communications, such signs being made by the pulsations of an electric current or currents transmitted from a distant station, said current operating directly, and without the intervention of any secondary current or mechanical contrivance, through a suitable metal marking-style, that is in continuous contact with the receiving-paper, thereby making marks thereon, which marks correspond with the groups of perforations in the paper composing the transmitted communication, or may be given by the pulsations from the spring 45 and block 46, so that in either case these form the received communication, substantially in the manner and with the effects described and shown, including any merely practical variations, analogous and equivalent in the means employed and the effects produced thereby.

In witness whereof I have hereunto set my hand, in the city of New York, this 17th day of April. A. D. 1848.

ALEXANDER BAIN.

Witnesses:
  W. SERRELL,
  LEMUEL W. SERRELL.